United States Patent [19]

Tietze

[11] 3,815,998

[45] June 11, 1974

[54] SURFACE CONTRAST SYSTEM AND METHOD

[75] Inventor: Armin Rudolf Tietze, San Jose, Calif.

[73] Assignee: International Business Machines Corporation, Armonk, N.Y.

[22] Filed: Oct. 30, 1972

[21] Appl. No.: 302,337

[52] U.S. Cl................ 356/120, 250/562, 250/572, 356/210, 356/237
[51] Int. Cl. ........................................ G01b 11/30
[58] Field of Search.... 356/124, 129, 120, 209–212, 356/237; 250/563, 219 DF, 562, 572

[56] References Cited
OTHER PUBLICATIONS
John Strong, Concepts of Classical Optics, Freeman, San Francisco, 1958, pp. 294–300.

Primary Examiner—Ronald L. Wibert
Assistant Examiner—F. L. Evans
Attorney, Agent, or Firm—Melvyn D. Silver

[57] ABSTRACT

A system and method for generating a shadow image of the surface of an object, the image capable of quantitative surface measurement by direct measurement of the slope of the surface at a given location, from which a surface roughness figure may be determined. Light of a defined angular distribution is directed upon the object surface. A collecting lens transmits an image of the surface to an image plane. An aperture located at the focal plane of the lens has at least a portion thereof in the light path to block out a portion of the possible angles of light passing through the collecting lens, limiting the reflected light from the surface to an angular light distribution in the beam to effect a contrast image between at least two areas in the image plane of an intensity contrast of at least two per cent.

15 Claims, 9 Drawing Figures

SURFACE CONTRAST SYSTEM AND METHOD

FIELD OF THE INVENTION

Optical systems for producing a contrast image of a surface representative of the deviation of the surface from a perfect plane, the contrast image capable of quantitative measurement.

PRIOR ART

Various means are known for observing and studying the surface of an object to determine such surface characteristics as surface roughness. These include bright field, dark field phase contrast and interference contrast microscopy methods. Determination of quantitative surface measurement is difficult if not impossible with these systems, as opposed to their more common uses as qualitative methods. A more common non-contact surface roughness quantitative measurement method is by interferometry for working in the multi-microinch range. Simple reflectance intensity measurements are adequate for a rougher measuring system.

Thus, it is an object of this invention to provide a method and system for:

a. optically determining the surface unevenness of an object surface by direct measurement of the slope of the surface at a given location;

b. to provide an image capable of measurement of such unevenness in the microinch and smaller region of precision;

c. to provide a contrast image of the object surface representative of the deviation of the surface from a perfect plane;

d. to more generally provide an inexpensive, rapid, non-contact method of surface quality measurement by utilizing optical means to generate images representative of the object surface and capable of precision measurement.

SUMMARY OF THE INVENTION

In one embodiment, light from a light source is first directed through a first aperture means, such as a small hole of specific diameter. The aperture is located at the focal plane of a subsequently located collimating lens. The aperture-focal length combination thus defines the angular distribution of the light within the beam. The light is then collimated by a collimating lens and this collimated light is directed upon the surface of the object under study. Each point on the object surface thus receives light of all angular distributions.

The light reflected from the surface is collected by a light collecting means such as a lens, which collects substantially all of the light reflected from the surface. The lens in turn images this light upon an image plane. Located between this collecting lens and the image plane at the focal plane of this lens, is a second aperture means, such as a knife edge. The knife edge is positioned to intercept a portion of the light being imaged from the collecting lens. This limits the reflected light imaged from the object surface to an angular light distribution in the imaged beam so as to create an intensity contrast image at the image plane. In a preferred embodiment, the knife edge blocks out 50 percent of the possible angles of light passing through the collecting lens. The intensity contrast thus seen between various areas of the image allows quantitative measurement of the surface uneveness to be made from these images. Sensitivity is a function of the initial angular distribution within the light beam as defined by the first aperture means and first focal length.

The preferred embodiment and other embodiments may thus be understood in conjunction with the following drawings and general descriptions.

IN THE DRAWINGS

FIGS. 5 a–c depict the light intensity vs. aperture position in the field, showing the slope curve useful for surface unevenness calculation.

Figure 6:
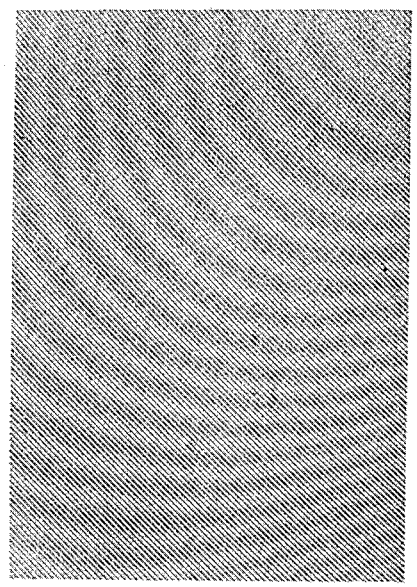

FIG. 6 depicts the surface of a turned aluminum sample in 10 × magnification in accordance with the contrast system of this invention.

Figure 7:
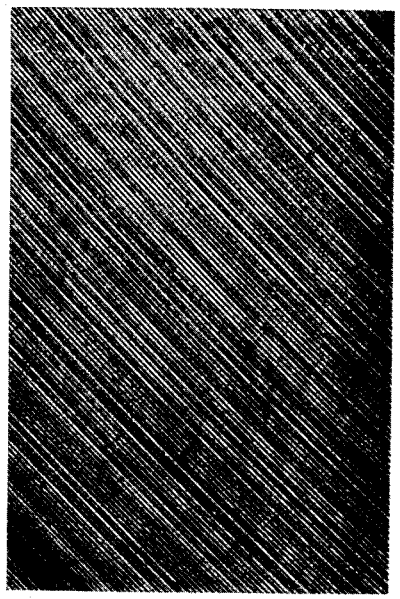

FIG. 7 depicts the surface of a polished plastic material in 10 × magnification in accordance with the contrast system of this invention.

GENERAL DESCRIPTION

Figure 1:
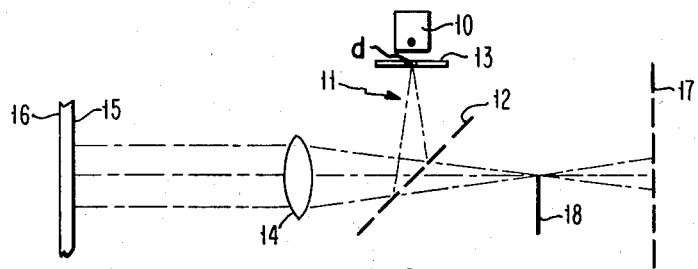
FIGS. 1, 2 and 3 represent three different schematic embodiments of the invention, showing the light source, collimating means, light collecting means, apertures and observing means for the surface image.
Figure 2:
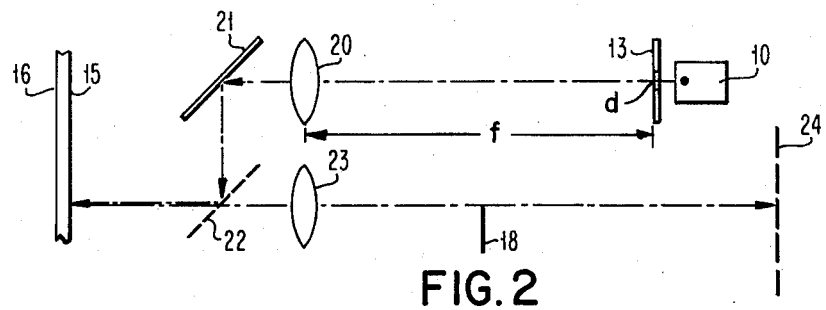
Figure 3:
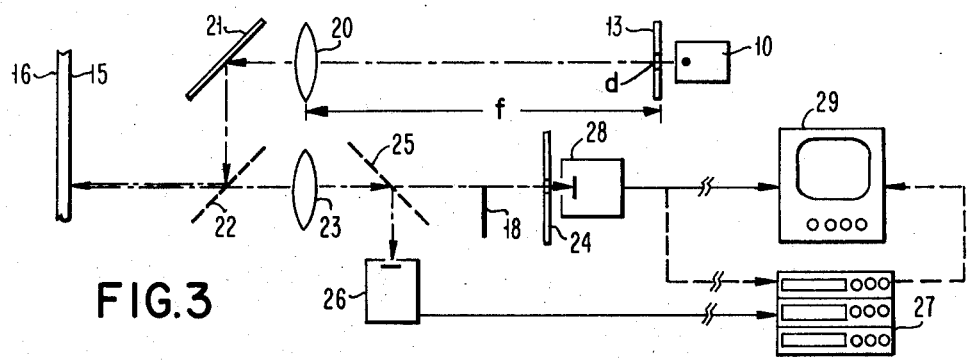

FIGS. 1, 2 and 3 show three different embodiments of this invention. All theoretically function similarly but for simplicity each one will be separately explained.

FIG. 1 shows the point source illuminator 10 directing a beam of light 11 towards a half silvered mirror 12. The point source of light 10 is utilized and noted as a first aperture means by alternatively utilizing aperture 13. Whether a separate aperture means 13 is utilized or simply a point source 10, makes no difference as the object is to produce a beam of light having a small angle distribution 2 $\delta$ within the beam. The angle 2 $\delta$ is defined as the tangent 2 $\delta = d/f$ where $d =$ diameter of the aperture, and $f =$ focal length of the collimating means such as lens 14. The aperture 13 should be located at the focal plane $f$ of the lens of first collimating means 14.

The collimating means 14 directs collimated light onto the the surface 15 of the object 16. The collimated light is in turn reflected back to the collimating means which now acts as the light collecting means to collect substantially all of the light reflected from the surface 15. This light is directed to an image plane 17 where an image of the surface may be viewed. The position of image plane 17 is well known from the relation $1/f = (1/a) + (1/b)$ where $a$ is distance from light collecting means 14 to the surface 15, and $b$ is the distance of the image plane 17 to light collecting means 14.

A second aperture means 18 is placed in the light path at the focal plane $f$ of the light collecting means 14. The function of this aperture will be described later. It is clear however from FIG. 1 that a single lens may be utilized for both collimating and light collection functions.

FIG. 2 shows an alternative embodiment wherein a light beam 10 directs light to a first aperture means 13 toward a collimating means such as collimating objective 20. Again, the first aperture means is located at the focal plane of objective 20. The light then progresses from mirror 21 and half silvered mirror 22 to the object surface 15 of object 16. The reflected light is then collected by a light collecting means such as lens 23 and imaged at image plane 24 after passing aperture 18. It is evident that the advantage of the system is to provide greater leeway in the angular distribution of the incoming light and the position of the image plane by using a collimating means and light collecting means having different focal length. The use of two means also allows greater magnification control of the surface image.

FIG. 3 is yet another embodiment of the basic invention in which the apparatus comprises illuminator means 10, aperture means 13, a collimating means 20, beam splitter 22, light collecting means 23, and the object surface 15 to be measured from object 16. Further, the aperture 18 is present as before. Additionally however there is a beam splitter 25, a detector 26, analyzer 27, and a TV camera 28 focused upon the image plane 24. Additionally, a TV receiver 29 may be utilized for visually observing the surface concurrent with electronic analyzation on the surface.

It is well known that where light emanates from a point source toward a collimating means, where the point source is located at the focal length of the collimating means the light beam will have an angular distribution within the light beam of the angle $2\delta$ defined as $2\delta = \arctan d/f$ where $d$ is the diameter of the hole in the aperture, for example, and $f$ is the focal length of the collimating means such as the lens above mentioned.

Figure 4:
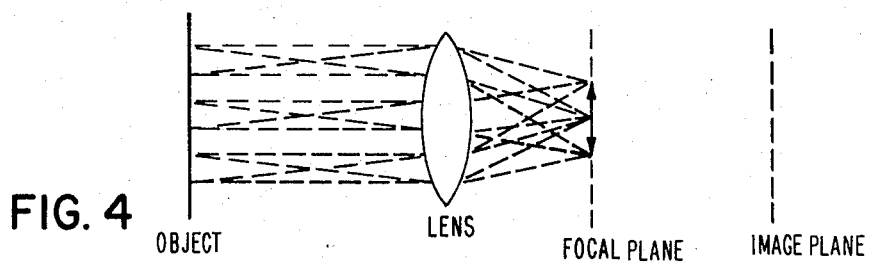
FIG. 4 depicts the light distribution from the surface to the light collecting means to the focal plane and the image plane.

This light is directed upon the surface of the object. Each point on the object surface thus receives a beam of light having the angular distribution $2\delta$ therein. Each point on the surface will then reflect each part of that beam according to the laws of reflection in accordance with the particular slope of the surface at that point on the surface. The light coming back from the object surface to the light collecting means is then focused at the focal plane as shown in FIG. 4. The light proceeds from the focal plane to the image plane where it may be observed visually or by electronic means.

Figures 5A, 5B, 5C:
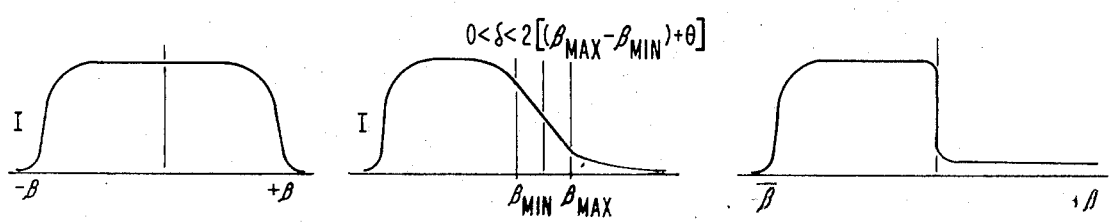

If an aperture is placed in the focal plane of the lens of FIG. 4, that aperture may be located to block out a certain portion of the light being transmitted back to the image plane. For example, if the aperture means located in the focal plane is a knife edge located to the optical axis of the collecting lens, then a particular distribution of light will occur when observed at the image plane. As seen in FIG. 5A, a plot is shown of intensity I versus the angular distribution of light reflected from the surface as seen at the image plane for the instant when the light collecting means collects substantially all of the light when reflected from the surface in the absence of an aperture, and images it at the image plane. The angular distribution range of collection from the surface ranges from a theoretical $-\beta$ to $+\beta$, the zero point arbitrarily taken as the midpoint or optic axis of the lens. The lack of squareness at the edges merely denote certain light scattering and edge effects are unavoidable in the optical system. Thus the intensity is uniform across the entire field.

FIG. 5B shows the case where the knife edge aperture blocks out 50 percent of the possible angles of light passing through the collecting lens in the system. Since each part of the surface reflects light according to its own deviation from flatness in further accordance with the angular distribution of light within the incoming beam, even though half of the light path and thus half of the possible angles is blocked by the aperture, the angular distribution will cause light to be shown on the image plane behind the aperture. Thus, there is from left to right, a uniform intensity followed by a fall off in intensity and then tapering off to a scattered light or noise level going from $-\beta$ to $+\beta$. However, a slope may be shown with the regions marked $\beta$ min to $\beta$ max which actually represents the slope of the surface of the object. The term slope is used to denote the first derivative of the surface.

The sensitivity of the system depends on the incoming light angular distribution. For example, as the angular distribution is reduced, the slope of the curve in FIG. 5b gets steeper, until as shown in FIG. 5c, the slope is vertical for effectively zero angular distribution. A contrast image of the object may be seen in FIGS. 6 and 7, which are representative of the types of surface representations achieved with this system.

The terms $\beta$ min and $\beta$ max have a particular meaning. ($\beta$ max–$\beta$ min) represents the angular distribution range of the slopes of the surface deviations from a perfect object surface. The midpoint is shown at the optic axis for convenience here since the aperture blocks off 50 percent of the light or in other words extends to the optic axis. This midpoint represents the change in slope of a given point on the surface. Thus, in this illustration where the midpoint is at the 50 percent contrast level, each point on the image having a 50 percent contrast against the background represents that point where the intensity changes or that is, the slope changes on the object surface. Since there will be a continual gray scale from essentially zero intensity, to 100 percent intensity for localized perfect mirror surface portions on the object surface, determination of the intensity from the plot against the measured intensity allows one to determine the change in slope at any given point on the object surface. Thus not only is the slope known, but the direction of change may be known depending upon intensity. The actual surface slope of a given point is represented by the intensity at that point.

In calibrating the system to generate a reference curve as in FIG. 5b, a "perfect" mirror surface is used as the object surface. In conjunction with the particular angular distribution in the incoming light beam, a FIG. 5b plot is generated. This is thus the reference for that $2\delta$ distribution incoming light. It is again clear that changing $2\delta$ thus directly affects the system sensitivity. As the mirror is then tilted, $\beta$ max and $\beta$ min are defined for the particular $2\delta$. It is preferred that ($\beta$ max $-\beta$ min) exceed the range of surface deviations expected on a particular surface, thus allowing the entire surface range of effects from the surface to fall on the slope range between $\beta$ max and $\beta$ min.

In typical operating embodiments, a pin hole of 2 –3 mm is used in conjunction with lens varying from 240 –760 mm in focal length.

If the aperture is not placed at the optic axis of the collecting lens, this has the effect of shifting the point at which the slope line on the curve of intensity versus angle of FIG. 5b shifts either to the right or left depending upon how far the aperture is placed in the system. Obviously, the aperture cannot be placed to block out all of the light. Preferably, it has been found that placing the aperture in the focal plane of the lens to the optic axis or the 50 percent blocking point is the easiest working range and most accurate. However, to effect a generalized contrast image, one need only interpose the aperture into the system so that at least a portion thereof is in the light path to limit the reflected light from the object surface to an angular light distribution in the beam to effect the contrast image between at least two areas in the image plane of an intensity contrast of at least 2 percent. This is essentially capable of resolution by the naked eye, and by electronic equipment which may be utilized as for example shown in FIG. 3.

As specific examples of this system, FIG. 6 depicts the surface of a turned aluminum sample in 10 × magnification where the illumination range is $2\delta = d/f = .0125$ ($d = 3$ mm and $f = 240$ mm) and the suitable maximum and minimum angles of the surface are $\beta$ max <feet, $\beta$ min <20 feet. Similarly, FIG. 7 depicts the surface of a polished plastic material in 10 × magnification where the illumination range is the same as that of FIG. 6.

A common light microscope may be modified to utilize the principles shown by this invention. For example, all that is needed is to place a beam splitter in front of a microscope objective, toward which is directed an external light source of angular distribution $2\delta$. Locating the focal plane of the objective is easy, and inserting an aperture at this point creates the contrast system noted, in the image plane.

Also, other types of apertures may be used, such as those having pie-shaped openings, or slits. These require recalibration of the system. If first and second aperture means are not symmetrical to the optical axis, the curve in FIG. 5B will be dependent on the direction of the cross section.

As noted above, the light collimating means and collecting means may be the same lens by the use of a beam splitter. In a particular embodiment the second aperture means is located in the light path to include an angular distribution in the reflected light from the object surface of ($\beta$max $-\beta$min) where $\beta$max = (arctan $d$ max/$f2$) and $\beta$min = (arctan $d$ min/$f2$), where $f2$ is the focal length of the light collecting means and dmax is the distance of the aperture edge from the optical axis through the light collecting means at which representations appear in the image plane of an intensity of 50 percent of maximum intensity, and dmin is the distance of the aperture edge from the optical axis 180° opposite dmax at which representations appear in the image of an intensity of 50 percent of maximum intensity independent of dmax, so that the contrast image obtained represents surface contour between $\beta$max and $\beta$min capable of quantitative measurement. Scanning electronic means as television and microphotometers can also be utilized to detect the image and to electronically integrate it, compare it, or analyze it as desired or just record it, and as is well known in the art. Further detection means may be utilized in place of the TV camera, and in conjunction with other optical means. In the preferred embodiment, light should be incident upon the object surface at a normal angle of incidence. Similarly, the collecting means should collect the light at a normal angle of incidence. Changing the angle to other than normal requires corrections to the system.

Thus, a method and system have been described offering high resolution capability in a contrast mode with surface topographic contrast representations of the surface of an object. In summary then, the steps comprise directing a light beam to a first aperture means through a collimating means for directing the collimated light upon the surface of an object. The aperture should be located at the focal plane of the collimating means which is classically a collimating lens.

The reflected light from the object surface is then imaged at the image plane of the light collecting means which is located to collect substantially all of the light reflected from the object surface. That light is directed toward the image plane past the second aperture means which is located at the focal plane of the light collecting means. The second aperture means is further located to have at least a portion thereof in the light path to limit the reflected light from the object surface to an angular light distribution in the beam to effect a contrast image between at least two areas of the image plane of an intensity contrast of at least 2 per cent. Preferably, a 50 percent contrast is desired. The system involved similarly utilizes the equipment as noted.

Thus has been described an optical surface contrast system fulfilling the objects of this invention. Specifically, the surface quality of an object may be visually or electronically observed. That surface image is capable of measurement in the microinch region of precision. A contrast image representative of the object surface is shown. Generally then an inexpensive, rapid and non-contact method of surface measurement is allowed using optical means to generate an image representative of the object surface and capable of precision measurement.

What is claimed is:

1. A method for forming a surface topographic contrast representation of the surface of an object having at least two areas of different contrast comprising the steps of:

emitting light from a first aperture means to a collimating means for directing collimated light upon the surface of the object, the first aperture means having a chosen aperture and located at the focal plane of the collimating means for causing a deliberate angular distribution in the collimated light determined as the tangent of the ratio of the chosen aperture to the focal length of the collimating means, each point on the object surface receiving light of each angular distribution;

imaging the reflected light from the object surface at the image plane of a light collecting means located to collect substantially all of the light reflected from the object surface and directing that light toward the image plane past a second aperture means located at the focal plane of the light collecting means; and further locating the second aperture means to have at least a portion thereof in the light path to limit the number of possible angles of light passing from the collecting means to the image plane to effect a contrast image between at least two areas in the image plane of an intensity contrast of at least two per cent, the intensity at any point directly proportional to the slope of the object surface at that imaged point;

2. The method of claim 1 including directing the light beam through an aperture means to a reflecting means for directing the light to the collimating means, so that the collimating means and the light collecting means are the same means.

3. The method of claim 1 wherein the second aperture means is a knife edge.

4. The method of claim 1 including locating electronic detecting means at the image plane to electronically detect the image.

5. The method of claim 1 including locating a television transmitting means at the image plane.

6. The method of claim 1 including locating photodetector means at the image plane.

7. The method of claim 1 including directing the light beam upon the object surface at a normal angle of incidence.

8. The method of claim 1 wherein the step of locating the second aperture means in the light path is such that 50 percent of the possible angles of light are blocked out.

9. A system for surface topographic representation of the surface of an object having at least two areas of different contrast comprising:

light means for directing a light beam, collimating means for receiving said light beam and for directing collimated light upon the surface of the object, first aperture means having a chosen aperture and located between said light means and said collimating means and at the focal plane of the collimating means for causing a deliberate angular distribution in the collimated light determined as the ratio of the chosen aperture to the focal length of the collimating means, each point on the object surface receiving light of each angular distribution, light collecting means located to collect substantially all of the light reflected from the object surface, imaging means located at the image plane of said light collecting means, and a second aperture means located at the focal length of the light collecting means between the light collecting means and the image plane, and located to have at least a portion thereof in the light path to limit the number of possible angles of light passing from the collecting means to the image plane to effect a contrast image between at least two areas in the image plane of an intensity contrast of at least two per cent, the intensity at any point directly proportional to the slope of the object surface at that imaged point.

10. The system of claim 9 including a reflecting means located to direct the incoming beam to the collimating means so that the collimating means and the light collecting means are the same means.

11. The system of claim 9 wherein the second aperture means is a knife edge.

12. The system of claim 9 including electronic detecting means located at the image plane.

13. The system of claim 9 including a television transmitting means located at the image plane.

14. The system of claim 9 including photodetector means located at the image plane.

15. The system of claim 9 wherein the second aperture means is located in the light path to block out 50 percent of the possible angles of light passing from the light collecting means.

* * * * *